United States Patent Office.

JACOB SCHMOLL, OF NEW YORK, N. Y.

Letters Patent No. 62,692, dated March 5, 1867.

---

IMPROVED ANTI-RHEUMATIC COMPOUND.

---

*The Schedule referred to in these Letters Patent and making part of the same.*

---

TO ALL WHOM IT MAY CONCERN:

Be it known that I, JACOB SCHMOLL, of the city, county, and State of New York, have invented a new and useful Anti-Rheumatic Compound; and I do hereby declare that the following is a full, clear, and exact description thereof, which will enable others skilled in the art to make and use the same.

This invention relates to a liquid compound, which is intended particularly for the purpose of counteracting rheumatic and similar attacks, and which, when applied to the afflicted parts, gives almost instantaneous relief. My compound is prepared of the extract of rain worms, extract of ants, camphor dissolved in alcohol, and extract of crocus sativus, and the ingredients are mixed together in about the following proportions: extract of rain worms, four parts; extract of ants, four parts; camphor dissolved in alcohol, three parts; extract of crocus sativus, one part. The extracts which I use in preparing my compound are made in the usual manner by treating the articles to be extracted with alcohol, either hot or cold.

The compound, when ready mixed, is put in small vials, and it can be used immediately, or it may be kept for a long time without spoiling, and it is used with great advantage in attacks like rheumatism, gout, neuralgia, and so forth.

Having thus described my invention, I claim as new, and desire to secure by Letters Patent—

An anti-rheumatic compound made as described.

The above specification of my invention signed by me this 26th day of October, 1866.

JACOB SCHMOLL.

Witnesses:
   WM. F. McNAMARA,
   W. HAUFF.